United States Patent
Leobandung et al.

(10) Patent No.: US 10,090,562 B2
(45) Date of Patent: Oct. 2, 2018

(54) THIN FILM LITHIUM ION BATTERY

(71) Applicant: INTERNATIONAL BUSINESS MACHINES CORPORATION, Armonk, NY (US)

(72) Inventors: Effendi Leobandung, Stormville, NY (US); Ghavam G. Shahidi, Pound Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/890,686

(22) Filed: Feb. 7, 2018

(65) Prior Publication Data

US 2018/0175454 A1 Jun. 21, 2018

Related U.S. Application Data

(63) Continuation of application No. 15/234,207, filed on Aug. 11, 2016, now Pat. No. 9,947,969.

(51) Int. Cl.
| | |
|---|---|
| *H01M 10/052* | (2010.01) |
| *H01M 10/0585* | (2010.01) |
| *C23F 4/00* | (2006.01) |
| *H01M 10/04* | (2006.01) |
| *H01M 10/0525* | (2010.01) |

(52) U.S. Cl.
CPC ........... *H01M 10/0585* (2013.01); *C23F 4/00* (2013.01); *H01M 10/0436* (2013.01); *H01M 10/0525* (2013.01); *H01M 2220/30* (2013.01)

(58) Field of Classification Search
CPC ................. H01M 10/052; H01M 10/0525
See application file for complete search history.

(56) References Cited

PUBLICATIONS

List of IBM Patents or Patent Applications Treated as Related dated Feb. 7, 2018, 2 pages.
Bates, J.B. et al., "Thin-film lithium and lithium-ion batteries" Solid State Ionics (2000) pp. 33-45, vol. 135.
Hui, H. et al., "Etching of Lithium Niobate: From Ridge Waveguides to Photonic Crystal Structures" ecio-conference, Eindhoven, The Netherlands (Jun. 11-13, 2008) pp. 75-78, WeD3.

*Primary Examiner* — Olatunji Godo
(74) *Attorney, Agent, or Firm* — Tutunjian & Bitetto, P.C.; Louis J. Percello

(57) ABSTRACT

A method for forming a thin film lithium ion battery includes, under a same vacuum seal, forming a stack of layers on a substrate including an anode layer, an electrolyte, a cathode layer and a first cap over the stack of layers to protect the layers from air. Under a same vacuum seal, the stack of layers is etched with a non-reactive etch process in accordance with a hardmask, and a second cap layer is formed over the stack of layers without breaking the vacuum seal. Contacts coupled to the cathode and the anode are formed.

20 Claims, 8 Drawing Sheets

THIN FILM LITHIUM ION BATTERY

BACKGROUND

Technical Field

The present invention generally relates to thin film batteries, and more particularly to lithium ion batteries having structures and methods of fabrication that permit processing without detrimental air exposure.

Description of the Related Art

Typical thin film lithium ion batteries use shadow evaporation to apply lithium since lithium cannot be exposed to air. This limitation precludes most conventional wafer processing techniques and limits the manufacturability of the battery. In addition, shadow evaporation is difficult to scale with changing battery dimensions.

SUMMARY

In accordance with an embodiment of the present principles, a method for forming a thin film lithium ion battery includes, under a same vacuum seal, forming a stack of layers on a substrate including an anode layer, an electrolyte, a cathode layer and a first cap over the stack of layers to protect the layers from air. Under a same vacuum seal, the stack of layers is etched with a non-reactive etch process in accordance with a hardmask, and a second cap layer is formed over the stack of layers without breaking the vacuum seal. Contacts coupled to the cathode and the anode are formed.

Another method for forming a thin film lithium ion battery includes, under a first vacuum seal: forming a stack of layers on a substrate including an anode current collector layer, an anode layer, an electrolyte, a cathode layer and a cathode current collector layer and forming a first cap over the stack of layers. A hardmask is formed over the stack of layers. Under a second vacuum seal: the method includes etching the stack of layers with a non-reactive etch process in accordance with the hardmask, and forming a second cap layer over the stack of layers. Contacts are formed to the cathode current collector layer and the anode current collector layer.

A thin film lithium ion battery includes an anode layer, a solid state electrolyte, a cathode layer and a first current collector layer formed in a stack of layers. A first cap is formed over the stack of layers. A hardmask is formed over the first cap. A second cap is formed over a top and sides of the first cap, the hardmask and the stack of layers to protect the stack of layers. A first contact is formed through the first cap, the hardmask and the second cap to make contact with the first current collector layer. A second contact is formed through the second cap to a second current collector layer that extends beyond the stack of layers and is in contact with the stack of layers.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein.

DETAILED DESCRIPTION

In accordance with the present principles, thin film lithium-ion batteries and methods for forming the same are provided. In one embodiment, the battery fabrication is performed in a single chamber without breaking vacuum and without the use of non-scalable shadow evaporation. In this way, lithium may be provided and patterned using wafer processing techniques similar to those employed for Si based processing.

It is to be understood that the present invention will be described in terms of a given illustrative architecture; however, other architectures, structures, substrate materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The present embodiments may include a design for a battery, which may have patterns be created in a graphical computer programming language, and stored in a computer storage medium (such as a disk, tape, physical hard drive, or virtual hard drive such as in a storage access network). The designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the design in question that are to be formed on a wafer or substrate. The photolithographic masks are utilized to define areas of the wafer (and/or the layers thereon) to be etched or otherwise processed.

Methods as described herein may be used in the fabrication of batteries. The resulting batteries can be distributed by the fabricator in a packaged form. In the latter case, the battery may be mounted in a single chip package (such as a plastic carrier, with leads that are affixed to a motherboard or other higher level carrier) or in a multichip package (such as a ceramic carrier that has either or both surface interconnections or buried interconnections). In any case, the battery may be integrated with other devices including chips, discrete circuit elements, and/or other signal processing devices as part of either (a) an intermediate product, such as a motherboard, or (b) an end product. The end product can be any product that uses portable energy storage from integrated circuit chips to devices ranging from toys and other low-end applications to advanced computer products having a display, a keyboard or other input device, and a central processor.

It should also be understood that material compounds will be described in terms of listed elements, e.g., SiGe. These compounds include different proportions of the elements within the compound, e.g., SiGe includes $Si_xGe_{1-x}$ where x is less than or equal to 1, etc. In addition, other elements may be included in the compound and still function in accordance with the present principles. The compounds with additional elements will be referred to herein as alloys.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, may be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors used herein may be interpreted accordingly. In addition, it will also be understood that when a layer is referred to as being "between" two layers, it can be the only layer between the two layers, or one or more intervening layers may also be present.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present concept.

Figure 1:
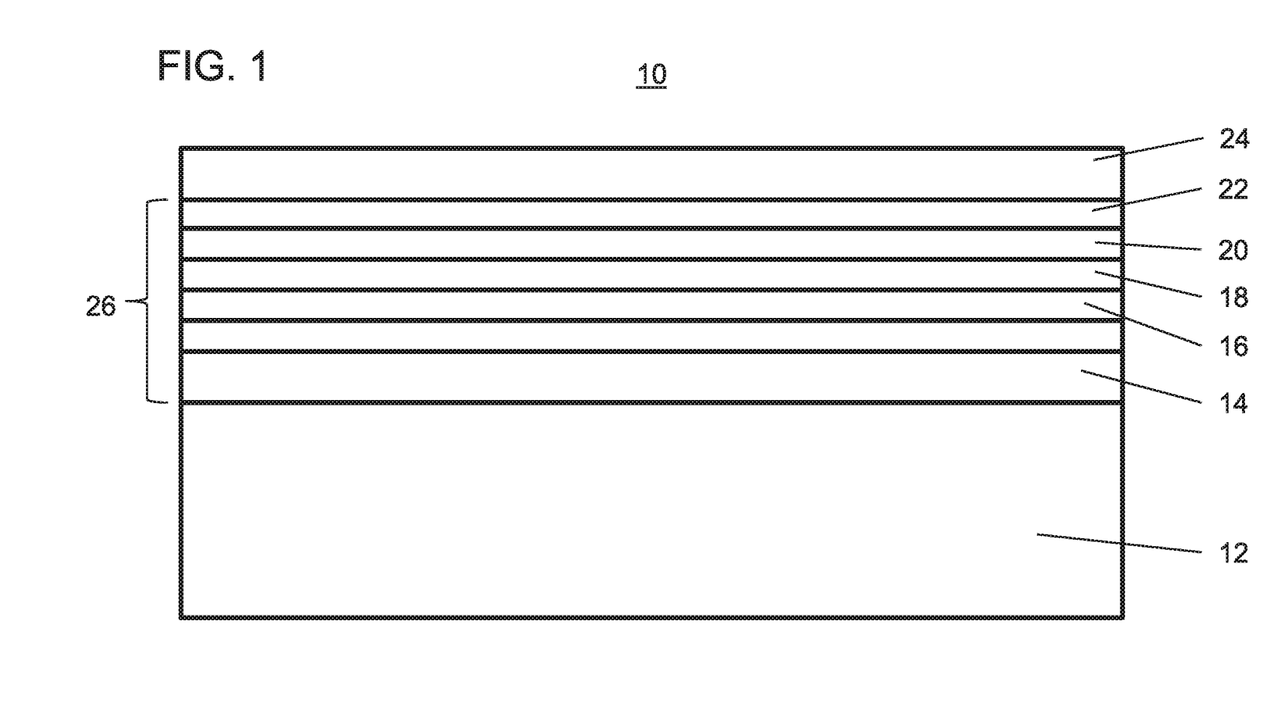
FIG. 1 is a cross-sectional view showing a stack of layers that includes an anode current collector layer, an anode layer, an electrolyte layer, a cathode layer and a cathode collector layer formed on a substrate under a same vacuum seal and protected by a dielectric cap in accordance with the present principles.

Referring now to the drawings in which like numerals represent the same or similar elements and initially to FIG. 1, a partially fabricated thin film lithium battery 10 is illustratively depicted in accordance with the present principles. The following process or process sequences are performed in a single chamber with no air break or in multiple chambers with no air break as exposure to air will have a detrimental effect on Li employed for the battery 10.

Starting with a substrate 12, which can be any suitable material, a metal stack 26 is deposited. Each layer of the metal stack 26 is deposited in-situ with no air break during deposition. The substrate 12 may include a semiconductor wafer to provide compatibility with wafer processing. In such embodiments, the substrate 12 may include a silicon-based material. Illustrative examples of Si-based materials suitable for the substrate 12 may include, but are not limited to, Si, SiGe, SiGeC, SiC, etc. and multi-layers thereof. In other embodiments, substrate 12 may include an insulator or conductor.

Although silicon is the predominantly used semiconductor material in wafer fabrication, alternative semiconductor materials can be employed, such as, but not limited to, germanium, gallium arsenide, gallium nitride, silicon germanium, cadmium telluride, zinc sellenide, etc. Although not depicted in FIG. 1, the semiconductor substrate 12 may also be a semiconductor on insulator (SOI) substrate. In other embodiments, substrate 12 may include glass, quartz, a ceramic material, metal, a plurality of different material layers, etc.

An anode current collector layer 14 is deposited on the substrate 12. The anode collector layer 14 may include a non-reactive metal such as Cu, Ag, Au, Pt, etc. depending on the type of battery 10. The anode current collector layer 14 may be deposited by evaporation, chemical vapor deposition (CVD), atomic layer deposition (ALD), sputtering or other suitable deposition process. The anode current collector layer 14 may include geometrical features to increase surface area (e.g., etching substrates 12 prior top deposition). The anode current collector layer 14 may be made thicker than other layers to ensure a portion of the thickness remains after etching in subsequent processing. While metal materials are described, other materials may be employed for anode current collector layer 14, e.g., carbon nanotube (CNT) films.

An anode layer 16 is deposited on the anode current collector layer 14. The anode layer 16 may include Li or a Li alloy deposited on the anode current collector layer 14. The anode layer 16 may be deposited by evaporation, CVD, ALD, sputtering or other suitable deposition process.

An electrolyte layer 18 is deposited on the anode layer 16. The electrolyte layer 18 may include a solid state electrolyte to provide in-situ processing with no air break. In one embodiment, the electrolyte layer 18 includes LiPON although other materials may be employed. The electrolyte layer 18 may be deposited by evaporation, CVD, sputtering or other suitable deposition process. In one embodiment, amorphous LiPON is employed and formed by an RF magnetron sputtering process. A layer or layers of LiPON provide ion conduction between anode and cathode. Solid polymer electrolytes provide an electrolyte, a binder, and a separator in a single material, which increases energy density.

A cathode layer 20 is deposited on the electrolyte layer 18. The cathode layer 20 may include a Li containing material, such as, e.g., $LiCO_2$, $LiMn_2O_4$, $LiFePO_4$ or other suitable cathode material (e.g., metal oxides). The cathode layer 20 may be deposited by evaporation, CVD, ALD, sputtering or other suitable deposition process.

A cathode current collector layer 22 is deposited on the cathode layer 20. The cathode current collector layer 14 may include a non-reactive metal such as Cu, Ag, Au, Pt, etc. depending on the type of battery 10. The cathode layer 20 may be deposited by evaporation, CVD, ALD, sputtering or other suitable deposition process. While metal materials are described, other materials may be employed for cathode current collector layer 22, e.g., carbon nanotube (CNT) films.

A dielectric layer or cap 24 is deposited over the cathode current collector layer 22 and may be formed over sides or edges of the stack 26 and substrate 12 to prevent exposure, corrosion or other damage. The dielectric layer 24 may include any suitable dielectric material or materials, such as, e.g., silicon oxide, silicon nitride, silicon oxynitride, etc. The dielectric layer 24 may be formed by CVD or any other suitable process.

In one embodiment, an anneal can be performed after one or more layers of the stack 26 have been formed. The anneal, if needed, is performed in-situ without breaking vacuum (e.g., no air break). Due to the cap 24, the metal stack 26 is protected from air (oxidation) and may be removed from a chamber (air break), if needed. In one embodiment, the device 10 remains without an air break for subsequent processing.

It should be understood that the anode and the cathode stacking order can be reversed from the order described in FIG. 1. For example, the cathode current collector may be formed on the substrate followed by the cathode, electrolyte and anode, etc. The deposition of the stack of layers 26 and the dielectric cap 24 may be performed in a same chamber while changing deposition sources or may be performed using a cluster tool or the like.

Figure 2:
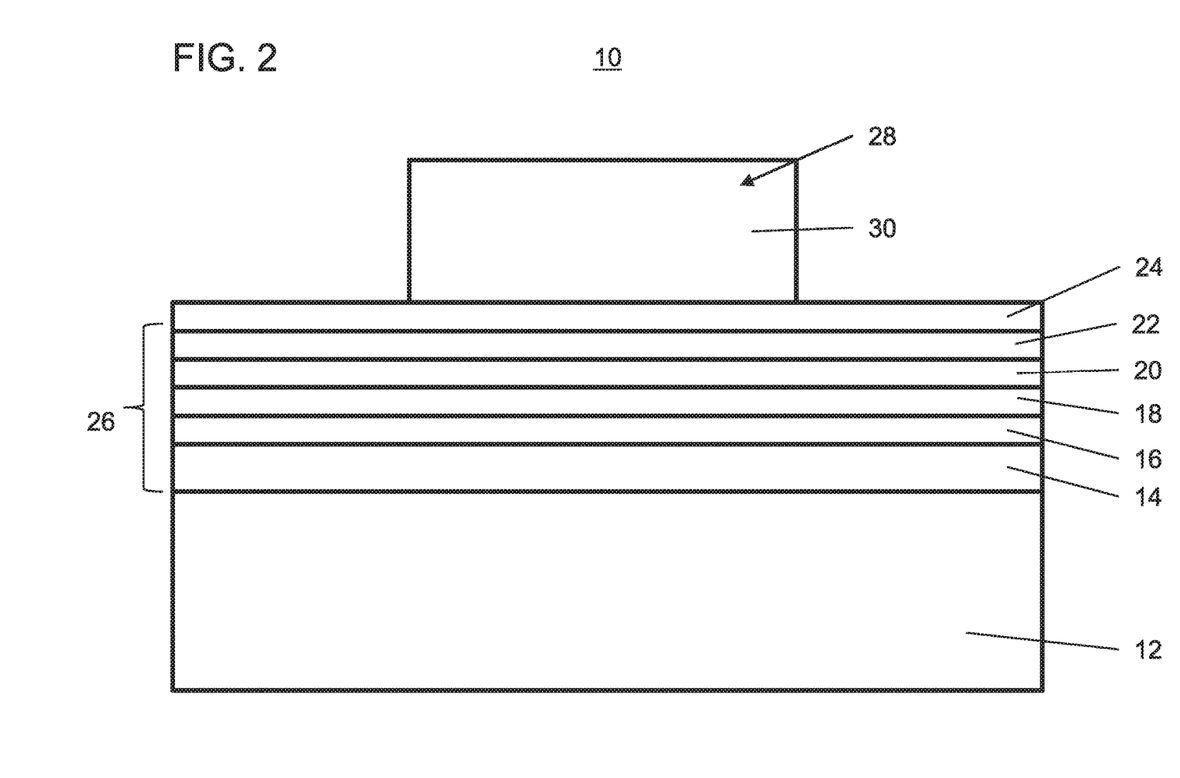
FIG. 2 is a cross-sectional view showing the stack of layers of FIG. 1 having a hardmask deposited and patterned on the dielectric cap in accordance with the present principles.

Referring to FIG. 2, a dielectric material 28 is deposited over the cap 24. The dielectric material 28 is selectively etchable relative to the dielectric layer 24. In one embodiment, the dielectric layer 24 includes a silicon oxide, and the dielectric material 28 includes a silicon nitride. Other dielectric material combinations are also contemplated.

The dielectric material 28 is patterned using a lithographic patterning process or other patterning technique to form a hardmask 30. The hardmask 30 is formed centrally over the cap 24. The hardmask 30 is formed to include a large thickness so that the hardmask 30 may be employed as an etch mask to etch through the layers of the metal stack 26 and have a sufficient thickness remaining after the etch process as will be described. In one embodiment, the hardmask 30 may be formed in-situ (without an air break) using directed self-assembly (DSA) techniques and based on the geometry of the device 10.

Figure 3:
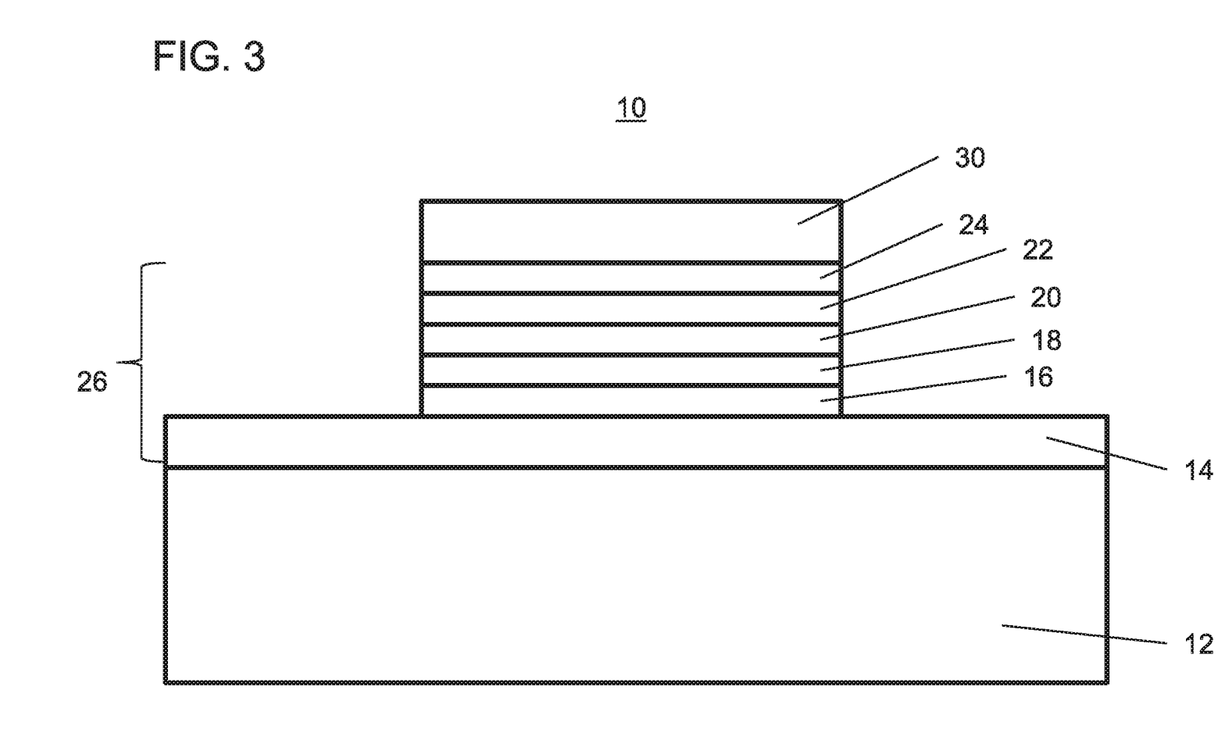
FIG. 3 is a cross-sectional view showing the stack of layers of FIG. 2 etched by a non-reactive etch in accordance with the hardmask pattern but leaving a lowest current collector layer unetched to extend beyond a footprint of the stack of layers in accordance with the present principles.

Referring to FIG. 3, an anisotropic etching process is performed to remove portions of the metal stack 26 outside of an area protected by the hardmask 30. The etching process includes a non-reactive etching process to etch the metal stack 26 away non-selectively. The etch process may include an ion mill process or the like. The ion mill process includes ion beam etching using non-reactive (noble) gasses or mixtures of these, e.g. Ar, Kr, and/or He, that can be accelerated towards the material to be etched to induce physical sputter-etching(molecular sand blasting). The etching process stops on and leaves the anode current collector layer 14 exposed. The anode current collector layer 14 may be made thicker than other layers to ensure a portion of the thickness remains after etching. The etching process may be timed to prevent the destruction of the anode current collector layer 14. The device 10 is maintained in a vacuum chamber during and after the etching process (no air break). A portion of the hardmask 30 remains after the etch process.

Figure 4:
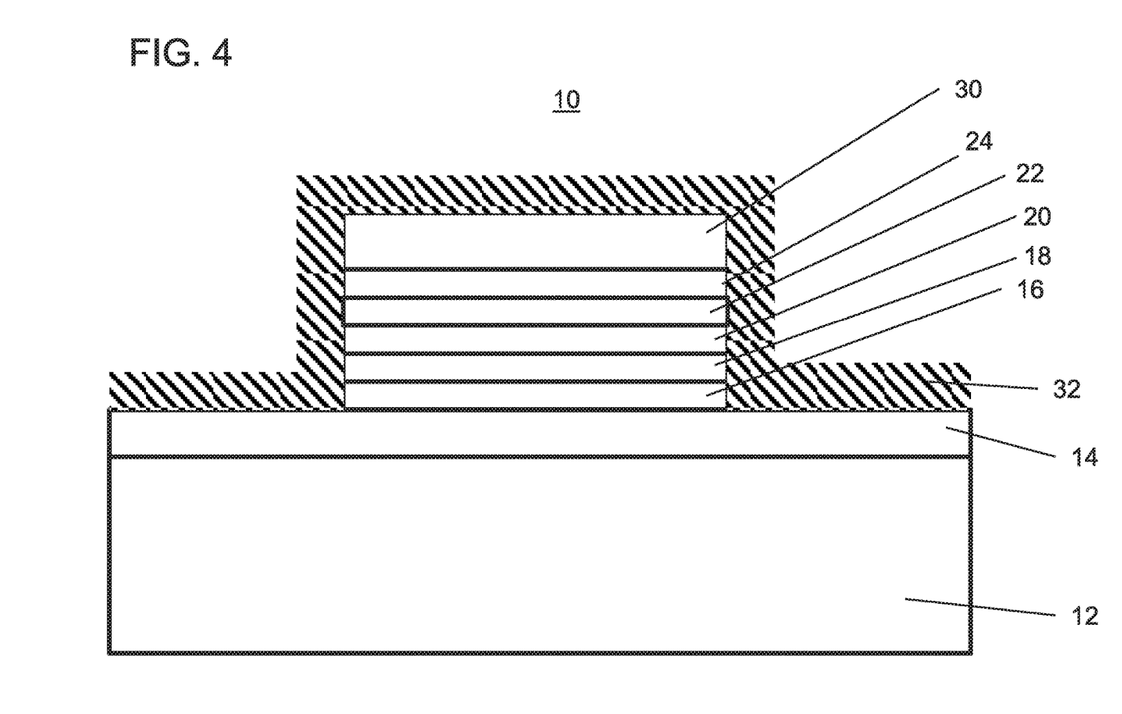
FIG. 4 is a cross-sectional view showing the stack of layers of FIG. 3 having a second dielectric cap deposited over the hardmask and the stack of layers under a same vacuum seal as FIG. 3 in accordance with the present principles.

Referring to FIG. 4, a second cap 32 is formed over the etched metal stack 26 and the exposed anode current collector layer 14. The cap 32 is deposited over the over sides or edges of the stack 26 and the exposed anode current collector layer 14 to prevent corrosion or other damage. The cap 32 may include any suitable dielectric material or materials, such as, e.g., silicon oxide, silicon nitride, silicon oxynitride, etc. The cap 32 may be formed by CVD or any other suitable process.

The device 10 is coated without breaking vacuum (no air break). This means that at least the etching process and the deposition process need to be performed in a same chamber at least not be exposed to air until after the cap 32 is formed. In one embodiment, a cluster tool may be employed where a etch process and a deposition process may be performed in a same cluster. A cluster tool for fabricating a semiconductor device refers to multiple chamber type composite equipment, which includes a transfer chamber with a wafer handling robot inserted at the center. A plurality of process chambers are positioned at each wall face of the transfer chamber; and a load lock chamber is installed at a different wall face of the transfer chamber. Multiple diverse processes (deposition, etching, annealing, cooling, may be carried out without breaking vacuum using a cluster tool.

Figure 5:
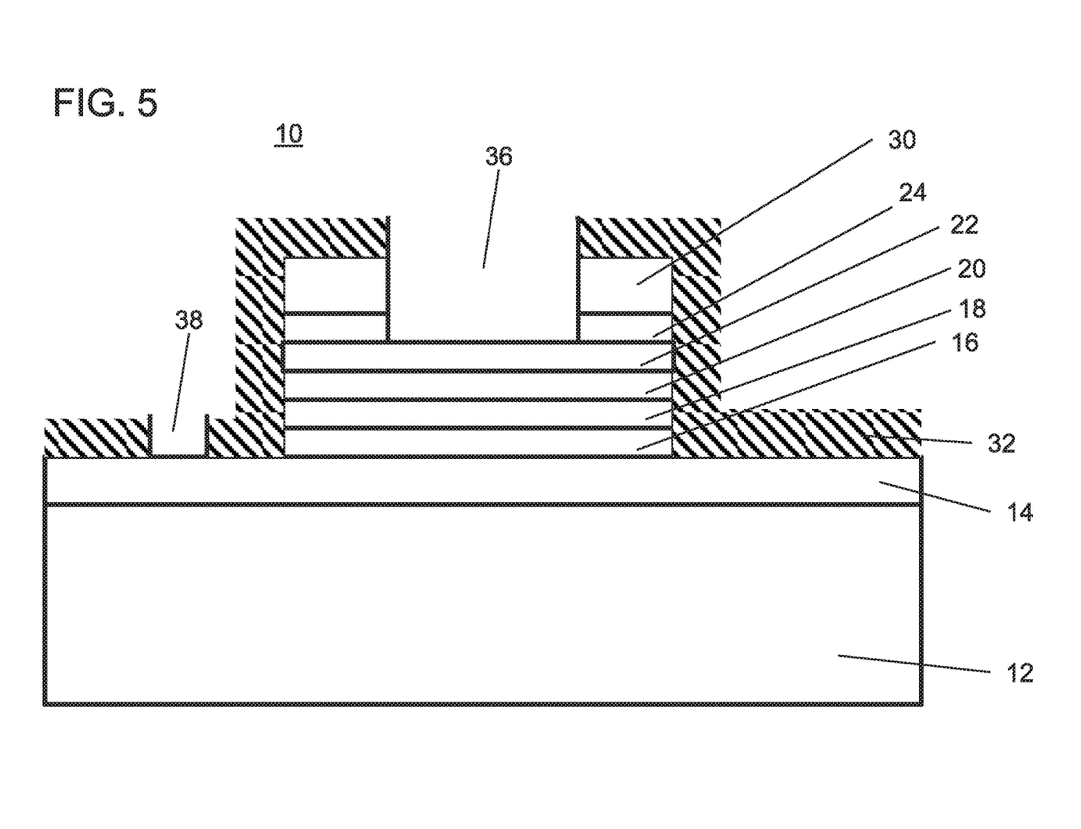
FIG. 5 is a cross-sectional view showing the stack of layers of FIG. 4 having a first contact opening formed through the second dielectric cap, the hardmask and the first dielectric cap to expose the stack of layers and a second contact opening through the second dielectric cap to contact the lowest current collector layer in accordance with the present principles.

Referring to FIG. 5, contact openings 36, 38 are formed. The contact opening 36 is formed through the dielectric cap 32, hardmask 30 and cap 24 to expose the cathode current collector layer 22. The contact opening 38 is formed through the dielectric cap 32 to expose the anode current collector layer 14.

The contact openings 36, 38 may be formed by an anisotropic etch (e.g., reactive ion etch (RIE)) through a patterned etch mask (not shown). The contact openings 36, 38 may be formed using a lithography process, or may be formed in-situ (without an air break) using, e.g., DSA. While the etching process is performed in a vacuum chamber, the metal stack layers (cathode 20, electrolyte 18 and anode 16) remain protected. In such a case, the device 10 may be exposed to air even after the contact open etch process since only the cathode current collector layer 22 and the anode current collector layer 14 are exposed by the etch. The material of the cathode current collector layer 22 and the anode current collector layer 14 prevent exposure to air.

Figure 6:
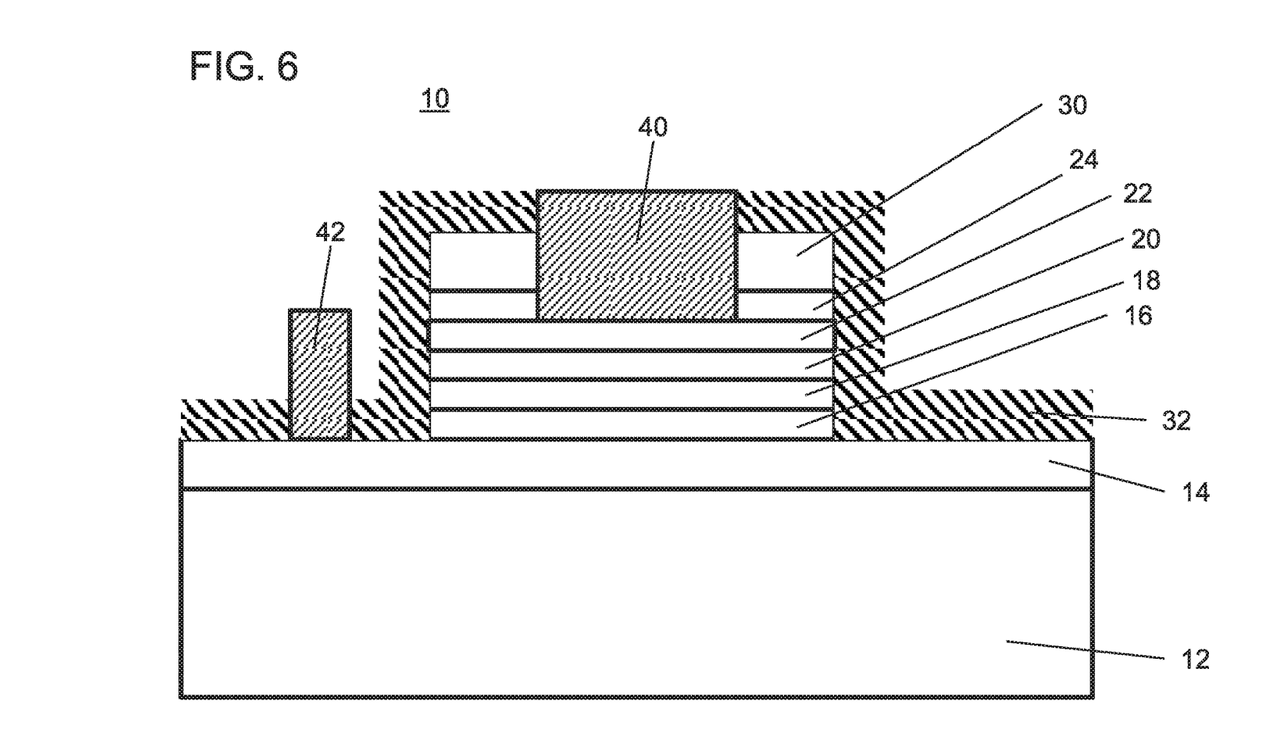
FIG. 6 is a cross-sectional view showing the stack of layers of FIG. 5 having a first contact formed through the first contact opening and a second contact formed through the second contact opening in accordance with the present principles.

Referring to FIG. 6, a metal deposition process is performed to grow contacts 40, 42 in contact with the cathode current collector 22 and the anode current collector 14, respectively. The metal deposition may include a CVD process followed by an etch to confine the metal to contact openings 36, 38 and form contacts 40, 42. In one embodiment, the metal deposition may include a selective metal deposition process that deposits metal on exposed portions of the cathode current collector layer 22 and the anode current collector layer 14. The contacts 40, 42 may include a same metal or metals as the cathode current collector layer 22 and/or the anode current collector layer 14. For example, the cathode collector layer 22 may include a non-reactive metal such as Cu, Ag, Au, Pt, etc. The contacts 40, 42 may include the same or different metals than the cathode current collector layer 22 and/or the anode current collector layer 14.

Figure 7:
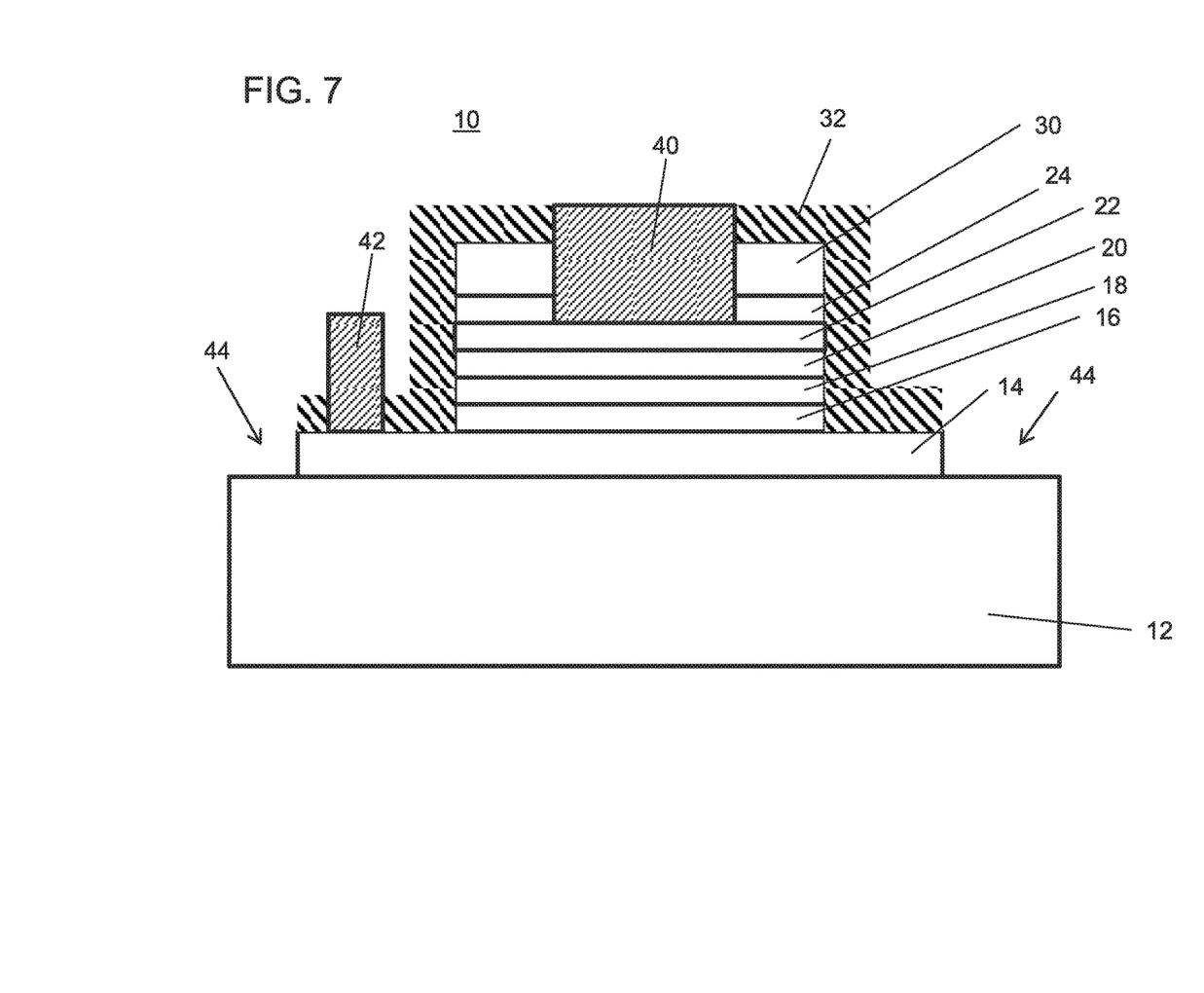
FIG. 7 is a cross-sectional view showing the stack of layers of FIG. 6 showing the lowest current collector layer etched to isolate each individual battery in accordance with the present principles.

Referring to FIG. 7, cut regions 44 may be formed by etching the cap 32 and the anode current collector layer 14 to isolate each battery device 10. The excess anode current collector layer 14 and cap 32 may be removed by lithographic patterning (etching).

In accordance with an illustrative embodiment, an energy density of about 300 microWh/cm$^2$ or greater can be achieved in accordance with the present principles. In one example, for an area of about 0.1 cm×0.1 cm, an energy density is about 3 microWh/cm$^2$. Energy density, $D_E = A V_{OC}$, where A is capacity (mAh/g) and $V_{OC}$ is open circuit potential (volts). This illustrative battery may be employed for a small processor with a power requirement in the microWatt range.

Figure 8:
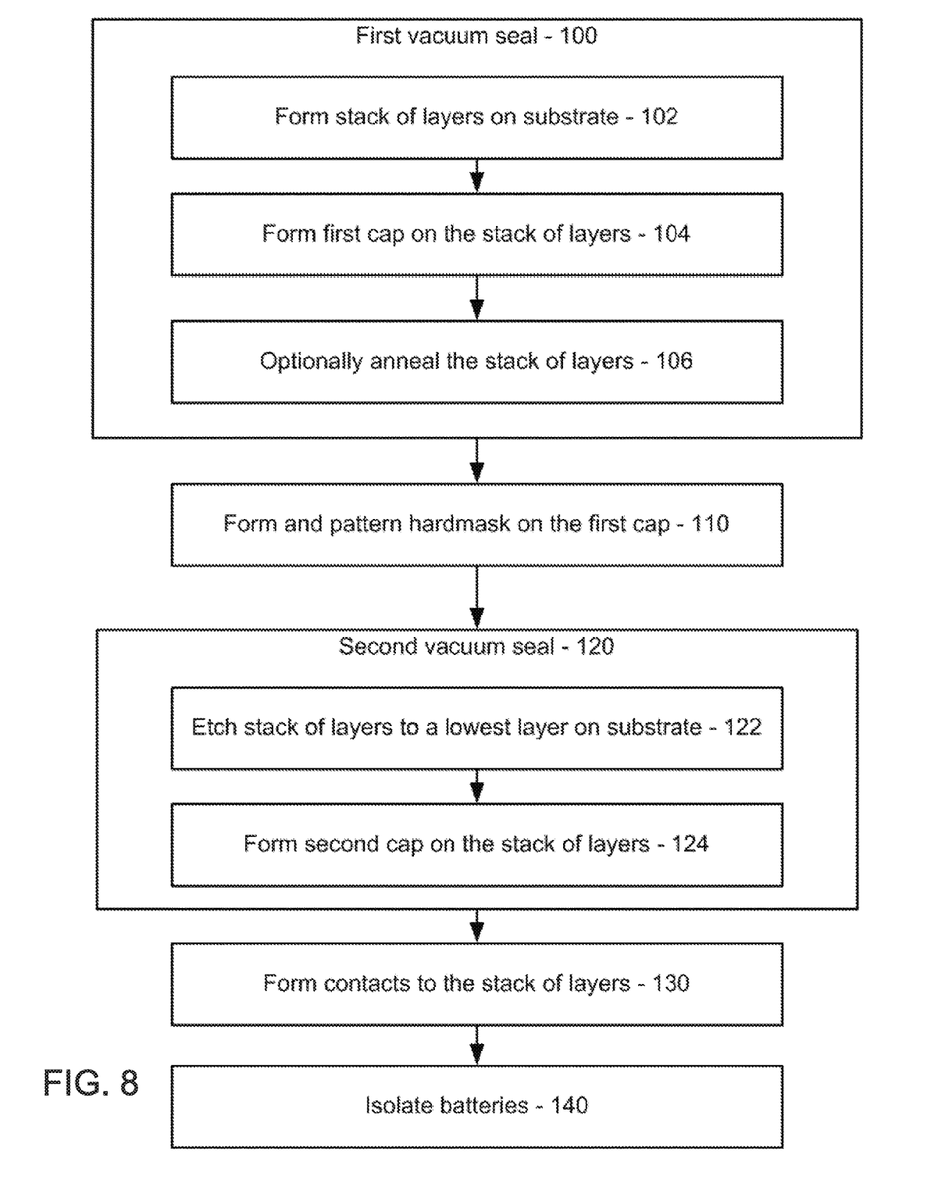
FIG. 8 is a block/flow diagram showing methods for forming a thin film lithium ion battery in accordance with the present principles.

Referring to FIG. 8, methods for forming a thin film lithium ion battery are illustratively shown. In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In block 100, processing occurs under a first vacuum seal (no air breaks). In block 102, a stack of layers are formed on a substrate including at least an anode layer, an electrolyte and a cathode layer. At least one of cathode current collector layer and an anode current collector layer may be formed in the stack of layers as well. The stack of layers etched with the non-reactive etch process may include etching down to a lowest layer of the stack of layers in contact with the substrate so that the lowest layer (e.g., anode or cathode current collector layer) extends beyond the stack of layers. This forms a landing area for a contact to be formed in later steps.

In block 104, a first cap is formed over the stack of layers to protect the stack of layers to protect Li materials from air and, in particular, oxygen. In block 106, an anneal process may be performed on the stack of layers under the first vacuum seal.

In block 110, a hardmask may be formed (e.g., deposited and patterned) over the stack of layers. The hardmask is formed in a vacuum chamber but may be formed in a different chamber after an air break since the Li containing portions of the battery device are protected by the dielectric cap.

In block 120, processing occurs under a second vacuum seal (no air breaks). In block 122, the stack of layers are etched with a non-reactive etch process in accordance with the hardmask. The non-reactive etch process includes an etch where the etchants remove materials without reacting to areas that are not being etched. This can occur by selecting materials that do not chemically react with the materials in the stack of layers (e.g., using inert gas ions to etch, etc.). In one embodiment, the stack of layers is etched with an ion mill process.

In block 124, a second cap layer is formed over the stack of layers for protection. The steps (block 122, block 124) under the second vacuum seal may be performed using a cluster tool, which is an automation huh that provides one or more of thermal processing, chemical vapor deposition, cooling, etc. without breaking vacuum.

In block 130, contacts are formed to the cathode current collector layer and the anode current collector layer, which are in contact with the cathode and the anode, respectively. One contact hole exposes the stack of layers for forming a contact therein. The underlying layers are protected by one of the current collector layers (e.g., cathode or anode depending on the order of layers). Another contact can be formed on a portion of the lowest layer that extends beyond the stack of layers.

In block 140, the layers of stacks (and second dielectric caps) may be etched in accordance with a pattern to isolate individual batteries.

It should be understood that the entire fabrication process may take place under a single vacuum seal or multiple vacuum seals, as described. This may include a single chamber or multiple chambers under vacuum, where the wafer is moved in the vacuum but to different chambers for processing.

Having described preferred embodiments for a thin film lithium ion battery (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for forming a thin film lithium ion battery, comprising:
  under a same vacuum seal, forming a stack of layers on a substrate including an anode layer, an electrolyte, a cathode layer and a first cap over the stack of layers to protect the layers from air; and
  under a same vacuum seal, etching the stack of layers with a non-reactive etch process and forming a second cap layer over the stack of layers without breaking the vacuum seal.

2. The method as recited in claim 1, wherein etching the stack of layers with the non-reactive etch process includes etching down to a lowest layer of the stack of layers in contact with the substrate so that the lowest layer extends beyond the stack of layers.

3. The method as recited in claim 1, wherein etching the stack of layers with the non-reactive etch process includes etching with an ion mill process.

4. The method as recited in claim 1, further comprising annealing the stack of layers under a same vacuum seal used in forming the stack of layers.

5. The method as recited in claim 1, wherein steps of etching the stack of layers with the non-reactive etch process and forming the second cap layer are performed using a cluster tool.

6. The method as recited in claim 1, further comprising opening a contact hole to expose the stack of layers for forming contacts.

7. The method as recited in claim 1, further comprising forming cut regions to isolate stacks of layers to form individual batteries.

8. A method for forming a thin film lithium ion battery, comprising:
  under a first vacuum seal:
    forming a stack of layers on a substrate including an anode current collector layer, an anode layer, an electrolyte, a cathode layer and a cathode current collector layer;
    forming a first cap over the stack of layers;
    forming a hardmask over the stack of layers;
  under a second vacuum seal:
    etching the stack of layers with a non-reactive etch process in accordance with the hardmask; and
    forming a second cap layer over the stack of layers.

9. The method as recited in claim 8, wherein etching the stack of layers with the non-reactive etch process includes etching down to a lowest layer of the stack of layers in contact with the substrate so that the lowest layer extends beyond the stack of layers.

10. The method as recited in claim 9, further comprising connecting a contact on a portion of a lowest layer of the stack of layers that extends beyond the stack of layers.

11. The method as recited in claim 8, wherein etching the stack of layers with the non-reactive etch process includes etching with an ion mill process.

12. The method as recited in claim 8, further comprising annealing the stack of layers under the first vacuum seal.

13. The method as recited in claim 8, wherein steps under the second vacuum seal are performed using a cluster tool.

14. The method as recited in claim 8, further comprising opening a contact hole to expose the stack of layers for forming contacts.

15. The method as recited in claim 8, further comprising forming cut regions to isolate stacks of layers to form individual batteries.

16. A thin film lithium ion battery, comprising:
  an anode layer, a solid state electrolyte, a cathode layer and a first current collector layer formed in a stack of layers;
  a first cap formed over the stack of layers;
  a hardmask formed over the first cap; and
  a second cap formed over a top and sides of the first cap, the hardmask and the stack of layers to protect the stack of layers.

17. The battery as recited in claim 16, wherein the anode layer, the solid state electrolyte and the cathode layer include lithium or a lithium compound.

18. The battery as recited in claim 16, wherein a second current collector layer is formed on a substrate.

19. The battery as recited in claim 16, wherein the layers of the stack of layers all include a same footprint.

20. The battery as recited in claim 16, further comprising:
  contacts contacting the first current collector layer and a second current collector layer, which extends beyond the stack of layers.

* * * * *